United States Patent [19]

Sato

[11] Patent Number: 5,559,619
[45] Date of Patent: Sep. 24, 1996

[54] LIQUID CRYSTAL ELECTRO-OPTICAL DEVICE AND MANUFACTURING METHOD FOR THE SAME

[75] Inventor: Masahiko Sato, Isehara, Japan

[73] Assignee: Semiconductor Energy Laboratory Co., Ltd., Atsugi, Japan

[21] Appl. No.: 195,451

[22] Filed: Feb. 14, 1994

Related U.S. Application Data

[62] Division of Ser. No. 950,771, Sep. 24, 1992, Pat. No. 5,309,263, which is a continuation of Ser. No. 616,359, Nov. 21, 1990, abandoned.

[30] Foreign Application Priority Data

Nov. 24, 1989 [JP] Japan ................................. 1-305888

[51] Int. Cl.⁶ .................................................. G02F 1/1337
[52] U.S. Cl. ........................... 359/75; 359/76; 359/79
[58] Field of Search ............................ 359/72, 74, 75, 359/79, 76

[56] References Cited

U.S. PATENT DOCUMENTS

| | | |
|---|---|---|
| 3,944,332 | 3/1976 | Tutihasi et al. . |
| 3,951,519 | 4/1976 | Schmidlin et al. . |
| 3,952,193 | 4/1976 | Haas et al. . |
| 4,119,840 | 10/1978 | Nelson . |
| 4,391,491 | 7/1983 | Freer et al. . |
| 4,695,490 | 9/1987 | McClelland et al. . |
| 4,738,515 | 4/1988 | Okada et al. ............................ 359/75 |
| 4,744,637 | 5/1988 | Sekimura et al. ....................... 359/68 |
| 4,781,441 | 11/1988 | Kanbe et al. . |
| 4,796,979 | 1/1989 | Tsuboyama ............................. 359/79 |
| 4,813,767 | 3/1989 | Clark et al. ............................. 359/76 |
| 4,840,462 | 6/1989 | Hartmann . |
| 4,902,106 | 2/1990 | Dijon et al. ............................. 359/75 |
| 5,109,292 | 4/1992 | Yamazaki et al. ...................... 359/54 |
| 5,148,300 | 9/1992 | Mizushima et al. .................... 359/76 |
| 5,299,037 | 3/1994 | Sakata ..................................... 359/41 |
| 5,309,263 | 5/1994 | Sato ........................................ 359/79 |

Primary Examiner—Sara W. Crane
Assistant Examiner—Courtney A. Bowers
Attorney, Agent, or Firm—Sixbey, Friedman, Leedom & Ferguson, P.C.; Gerald J. Ferguson, Jr.; Eric J. Robinson

[57] ABSTRACT

A liquid crystal electro-optical device having gettering means therein and a method for manufacturing such a liquid crystal electro-optical device are disclosed. For example, in a liquid crystal panel disposed in the device, polyvinyl carbazole film is formed as the getting means on at least one of a pair of substrates, and the film has a function to absorb ionized impurities existing in liquid crystal disposed in the device. In virtue of the film, ionized impurities in the liquid crystal layer are decreased, and by heating the liquid crystal panel, the function of the polyvinyl carbazole film, i.e. the function to absorb ionized impurities, is enhanced. Consequently, a liquid crystal electro-optical device free from after-image which was a problem in conventional liquid crystal display devices can be obtained.

22 Claims, 3 Drawing Sheets

LIQUID CRYSTAL ELECTRO-OPTICAL DEVICE AND MANUFACTURING METHOD FOR THE SAME

This is a divisional application of Ser. No. 07/950,771 filed Sep. 24, 1992, U.S. Pat. No. 5,309,263; which itself was a continuation of Ser. No. 07/616,359, filed Nov. 21, 1990, abandoned.

BACKGROUND OF THE INVENTION

1. Field of the Invention

The present invention relates to a liquid crystal electro-optical device and a method for manufacturing the same.

2. Description of the Prior Art

Ferroelectric liquid crystal display devices which are now internationally being researched are superior in high response speed, wide angle of visibility, and the like in comparison to liquid crystal display devices of TN (Twisted Nematic) type which have been used for watches, electric calculators, and the like for years.

The high response speed of ferroelectric liquid crystal results from spontaneous polarization which liquid crystal itself has. Generally a response time of ferroelectric liquid crystal is in inverse proportion to spontaneous polarization and external electric fields and is in proportion to viscosity. So that, conventionally ferroelectric liquid crystal whose spontaneous polarization was small was useless due to slow response speed, and the development of ferroelectric liquid crystal which has large spontaneous polarization is in progress. However, recently it was found that this spontaneous polarization has a large influence on switching of ferroelectric liquid crystal.

Namely, because of the presence of the spontaneous polarization, polarization charges produce an electric field in a ferroelectric liquid crystal layer even in the condition where an electric field is not applied from outside and ionized impurities such as sodium ions, potassium ions, and lithium ions are unevenly distributed in the ferroelectric liquid crystal layer. Consequently the ionized impurities restrain the direction of the spontaneous polarization of ferroelectric liquid crystal molecules, so that the ferroelectric liquid crystal molecules which show bistability in an ordinary condition cannot help being monostable, which causes the degrade of ratio of contrast.

As orientation film for orienting liquid crystal molecules in a liquid crystal device is used a silicon oxide film obliquely formed by evaporation, organic macromolecule compound film such as polyimide film and polyamide film, and the like. Particularly, a polyimide film is widely employed since it is superior in heat resistance and it is easily formed. A solution of polyimide is applied on a substrate and a solvent in the solution is removed, and then the substrate is subjected to a thermal treatment if necessary, to thereby form a polyimide film. Subsequently this polyimide film is subjected to rubbing treatment, and thereby an orientation film is obtained.

However in a ferroelectric liquid crystal electro-optical device using strongly insulating films such as polyimide film, silicon oxide film, or the like as orientation films, the ionized impurities in the liquid crystal are unevenly distributed on interfaces between the liquid crystal layer and the orientation films when dipoles of the ferroelectric liquid crystal molecules are aligned, and consequently uneven distribution of electric charges is produced in the device.

As the result, for example, when a fixed display is maintained for a few hours in a ferroelectric liquid crystal display device and subsequently is changed to a different display, the fixed display still remains (the remaining display is referred to as after-image hereinafter). This is a big obstacle for display devices.

In order to solve this problem, resistance of the orientation films was made low. For example, in Japanese Patent Provisional Publication No. sho62-295028 is disclosed liquid crystal display devices which are provided with orientation films made from polyimide mixed with conductive particles such as metallic powders or conductive organic compounds.

Generally, orientation films provided in ferroelectric liquid crystal display devices are superior in switching when the thickness of the orientation films are 1000 Å or less, preferably 500 to 200 Å. However, it is extremely difficult to disperse the conductive particles uniformly in such a thin film.

Further, some of the conductive particles mixed in orientation films are naturally bared on the surfaces of the orientation films. As time passes, such conductive particles enter the liquid crystal layer and thereby ionized impurities are increased in total in the liquid crystal layer, and as the result the after-image is increased. In addition, by the increase of the ionized impurities, an electric current flowing in the liquid crystal layer is increased, which causes deterioration of the liquid crystal material and degrades the reliability of the device. Furthermore, due to this increase of the electric current, the power consumption is increased.

Generally, liquid crystal contains a few ionized impurities since reagent used in a process of synthesizing the liquid crystal and secondary products are not completely removed. So that, a method of purifying repeatedly the liquid crystal by means of recrystallization or a method of purifying the liquid crystal by means of zone melting method would be adopted as a method for decreasing the ionized impurities in the liquid crystal. However, these purifying methods need much time and have low yield. Therefore, cost is raised.

Even though the liquid crystal is sufficiently purified, impurities enter the liquid crystal material while manufacturing the liquid crystal device. Further, ionized impurities enter there from the orientation films and sealed portion even after the device is completed. Therefore, it can not be avoided that ionized impurities enter a liquid crystal layer.

Such ionized impurities existing in a liquid crystal layer provided in a liquid crystal electro-optical device such as a ferroelectric liquid crystal electro-optical device, a liquid crystal electro-optical device of TN type, and a liquid crystal electro-optical device of STN type hinder directions of liquid crystal molecules in the liquid crystal layer from being turned, which consequently degrades quality of display.

SUMMARY OF THE INVENTION

It is an object of the present invention to provide a liquid crystal electro-optical device having gettering means for absorbing ionized impurities.

It is another object of the present invention to provide a manufacturing method for a liquid crystal electro-optical device which method is characterized in that ionized impurities are absorbed in gettering means.

The liquid crystal electro-optical device according to the present invention has gettering means, so that ionized impurities in a liquid crystal layer are absorbed in the gettering means and thereby the ionized impurities existing in the liquid crystal layer are decreased. Therefore, directions of liquid crystal molecules in the liquid crystal layer can be easily turned. For this reason, it is ensured that the directions are changed depending on voltages applied between a pair of electrodes sandwiching the liquid crystal layer and that picture elements in the liquid crystal electro-optical device are made on and off depending on the voltages.

In the case of a ferroelectric liquid crystal electro-optical device, it is ensured that the directions are changed depending on voltages applied between a pair of electrodes sandwiching the ferroelectric liquid crystal layer and that picture elements in the ferroelectric liquid crystal electro-optical device are made on and off depending on the voltages. This is because, since ionized impurities in the liquid crystal layer are absorbed in gettering means, electric field formed by the ionized impurities weakly acts on the ferroelectric liquid crystal and further ionized impurities left in the ferroelectric liquid crystal layer are very few.

In the case of liquid crystal electro-optical devices of TN type and STN type, since ionized impurities left in liquid crystal layer are very few, it is ensured that picture elements in the liquid crystal electro-optical device are made on and off depending on voltages applied between a pair of electrodes.

As the gettering means, polyvinyl carbazole film may be provided on one or both of a pair of substrates.

In a method for manufacturing a liquid crystal electro-optical device according to the present invention, ionized impurities are absorbed in the gettering means.

For example, in the case of a liquid crystal panel having a polyvinyl carbazole film on one electrode substrate, after injecting liquid crystal into the liquid crystal panel, the liquid crystal panel is heated, whereby ionized impurities are absorbed in the polyvinyl carbazole film. Alternatively, in the case of a liquid crystal panel having a polyvinyl carbazole film on one electrode substrate and a polyimide film on the other electrode substrate, the liquid crystal panel is heated and additionally DC voltage is applied between electrodes on the polyvinyl carbazole film side as positive electrodes and electrodes on the polyimide film side as negative electrodes, whereby the polyvinyl carbazole film is made to absorb the ionized impurities aggressively. Alternatively, in the case of a liquid crystal panel having polyvinyl carbazole films on both of a pair of substrates, the liquid crystal panel is heated and additionally DC voltage is applied between electrodes on one side as positive electrodes and electrodes on the other side as negative electrodes, whereby the polyvinyl carbazole films, particularly the polyvinyl carbazole film on the positive electrode side, are made to absorb the ionized impurities. By performing both of the heating and the application of DC voltage, time required for all the processes in the method according to the present invention is shortened. That is, by forming electric field between electrodes, ionized impurities are quickly absorbed in the polyvinyl carbazole film.

It is preferred that the heating of liquid crystal panel is carried out after sealing an opening for injecting liquid crystal. This is because, since the panel is closed, ionized impurities can not enter the panel from the outside. Therefore, liquid crystal in the liquid crystal panel is not influenced by ionized impurities almost permanently after the heating.

According to electric fields applied externally, ferroelectric liquid crystal molecules used in the present invention take either a first condition where liquid crystal molecules are optically stable or a second condition where liquid crystal molecules are optically stable, and the liquid crystal can be liquid crystal in chiral smectic C phase (SmC*), chiral smectic I phase, and chiral smectic H phase.

Since resistivity of polyvinyl carbazole is less than that of polyimide, there is less happening in the case of using a polyvinyl carbazole film than in the case of using a polyimide film that dipole moments of liquid crystal molecules remain in wrong conditions, the first condition or the second condition.

Thickness of polyvinyl carbazole films according to the present invention is preferably 100 Å to 1000 Å. When a polyvinyl carbazole film provided in a liquid crystal panel is thick, voltage is mainly applied to this film rather than a liquid crystal layer. That is, ratio of the voltage value practically applied to the ferroelectric liquid crystal to the voltage value applied between the electrodes is small.

DETAILED DESCRIPTION OF THE PREFERRED EMBODIMENTS (Embodiment No. 1)

In this embodiment is manufactured a ferroelectric liquid crystal electro-optical device in which polyvinyl carbazole films are formed on both of a pair of substrates.

Figure 1:
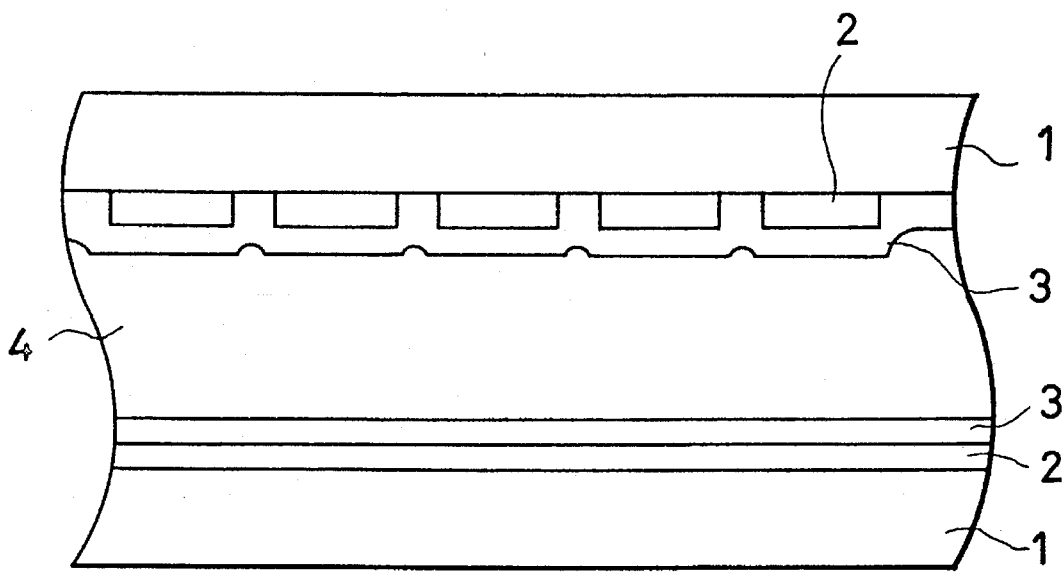
FIG. 1 shows a cross sectional schematic view of a liquid crystal electro-optical device according to the present invention.

In FIG. 1 is shown a cross sectional schematic view of a ferroelectric liquid crystal electro-optical device according to this embodiment.

ITO (Indium Tin Oxide) thin films were deposited on a pair of substrates I made from soda-lime glass by means of DC magnetron sputtering method and subsequently the ITO thin films were patterned by means of photolithography method, whereby electrode strips 2 were formed on the pair of substrates. On the pair of electrode substrates, a benzene chloride solution in which polyvinyl carbazole was dissolved in the ratio of 2% was applied by means of spin coat method at a rotation frequency of 3000 rpm for 20 seconds. After the application of the solution, the substrates were heated for about 1 hour at a temperature of 150° C. and thereby a solvent in the solution was removed. Thus, polyvinyl carbazole thin films 3 were obtained on the pair of electrode substrates. The film thickness was 300 Å. Then the polyvinyl carbazole thin film formed on one substrate was rubbed by the use of cotton cloth.

Then 20 mg of polystyrene particles having a diameter of 2.5 μm (omitted in the drawing) were mixed with 50 cc of isopropyl alcohol (IPA) and were well dispersed in the IPA by application of supersonic wave, and subsequently the mixture was sprinkled on one substrate by means of spin coat method at a rotation frequency of 1000 rpm for 20 seconds.

Then the substrates were mated, whereby a panel was manufactured.

Subsequently, ferroelectric liquid crystal 4 having properties shown in Table 1 was injected into the panel by means of vacuum injection method, and then an opening for injecting liquid crystal was sealed with an ultraviolet ray hardening adhesive agent.

TABLE 1

| Phase: Iso ——— SmA ——— SmC* ——— Cry |
|---|
| Transition Temperature: 75° C.  68° C.  −2.1° C. |
| Spontaneous Polarization: −7nC/cm$^2$ (25° C.) |
| Cone Angle: 27° |

Iso: isotropic phase
SmA: smectic A phase
SmC*: chiral smectic C phase
Cry: crystal Resistivity between the electrodes provided in the ferroelectric liquid crystal panel manufactured in the above manner was $10^{11}$ to $10^{12}$ Ωcm.

The ferroelectric liquid crystal panel was connected to a driving circuit and pictures were displayed. First, a fixed picture was displayed for two hours. After the two hours, the fixed picture was changed to a different picture. For reference, also in the case of a liquid crystal panel having polyimide thin films formed on both inside surfaces of one pair of substrates, a fixed picture was displayed for two hours and then changed to a different picture. Then contrast of display was measured concerning the both panels. Hereupon, for the first two hours, namely during the first picture, contrast in the panel having polyvinyl carbazole films according to this embodiment was around 18 to 19, and contrast in the referential panel having polyimide thin films was around 21 to 25. That is, the referential panel had higher contrast than the panel in this embodiment. This is because a polyimide film is superior to a polyvinyl carbazole film in orienting liquid crystal molecules. However, the contrast of 18 to 19 obtained in the panel according to this embodiment is sufficient for a display device.

When the different picture was displayed, contrast of the panel according to this embodiment was around 17 to 18, which is almost the same as the contrast in this panel during the fixed picture. On the contrary, contrast in the referential panel was largely reduced to about 9 to 11 when the fixed picture was changed to a different picture. From this measurement, it is obvious that, in the case of a panel having polyimide films formed on both of one pair of electrode substrates, a first picture remains when a following picture is displayed, that is, after-image appears. Also, it was found that the after-image could be avoided by forming polyvinyl carbazole films on inside surfaces of a pair of substrates in a liquid crystal panel.

In Embodiments No. 2 and No. 3 to be described hereinafter, both of a polyimide film and a polyvinyl carbazole film are used. A polyvinyl carbazole film subjected to rubbing treatment is superior in absorbing ionized impurities of donor, but inferior to a polyimide film subjected to rubbing treatment in orienting liquid crystal molecules. For this reason, in ferroelectric liquid crystal panels according to Embodiments No. 2 and No. 3, a polyvinyl carbazole film is provided on one of a pair of substrates and a polyimide film subjected to rubbing treatment is provided on the other of the pair of substrates.

(Embodiment No. 2)

In this embodiment is manufactured a ferroelectric liquid crystal electro-optical device in which a polyvinyl carbazole film is provided on one of a pair of substrates and a multi-layer comprising a polyimide film and a polyvinyl carbazole film is provided on the other of the pair of substrates.

Figure 2:
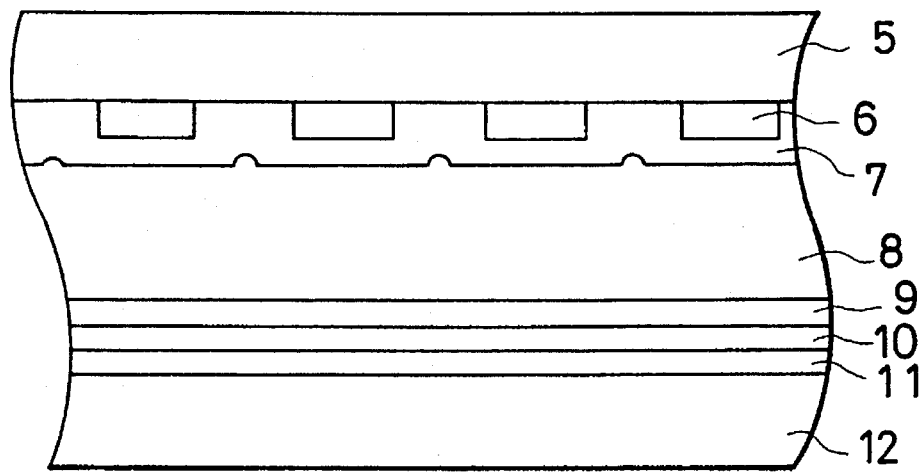
FIG. 2 shows a cross sectional schematic view of another liquid crystal electro-optical device according to the present invention.

In FIG. 2 is shown a cross sectional schematic view of ferroelectric liquid crystal electro-optical device according to this embodiment.

In the same way as in Embodiment No. 1, an ITO thin film was deposited on a substrate 5 made from soda-lime glass by means of DC magnetron sputtering method, and then the film was patterned by means of photolithography method to thereby form electrode strips 8. On this electrode substrate, a benzene chloride solution in which polyvinyl carbazole was dissolved in the ratio of 2% was applied by means of spin coat method at a rotation frequency of 3000 rpm for 20 seconds. After the application of the solution, the substrate 5 was heated for about one hour at a temperature of 150° C., and thereby a solvent in the solution was removed. Consequently a polyvinyl carbazole thin film 7 was obtained on the substrate 5 over the electrode strips 6. The film thickness was 300 Å.

On the other substrate 12 made from soda-lime glass was formed electrode strips 11 in the same manner as the above, and subsequently an N-methyl-2-pyrolidone solution in which polyimide was dissolved in the ratio of 3% was applied thereon by means of spin coat method at a rotation frequency of 3000 rpm for 20 seconds. Then, the substrate 12 was heated for about two hours at a temperature of 300° C., and consequently a polyimide film 10 was obtained on the substrate 12 over the electrode strips 11. The film thickness was 500 Å. The polyimide film 10 was subjected to rubbing treatment in one direction by the use of velvet. At this moment, the polyimide film was rubbed rather strongly in comparison to the rubbing treatment carried out in Embodiment No. 1. Then, on this polyimide film 10, a benzene chloride solution in which polyvinyl carbazole was dissolved in the ratio of 2% was applied by means of spin coat method at a rotation frequency of 5000 rpm for 20 seconds. Then, the substrate 12 was heated for about one hour at a temperature of 150° C. and thereby a solvent in the solution was removed. Consequently a polyvinyl carbazole thin film 9 was obtained on the polyimide film 10 formed on the substrate 12. The film thickness was 150 Å. This polyvinyl carbazole film 9 formed on the polyimide film 10 must not be formed thick, lest an effect of the polyimide film should disappear due to a thick polyvinyl carbazole film. The thickness of the polyvinyl carbazole film formed on the polyimide film should be approximately 200 Å or less.

Then, 20 mg of polystyrene particles having a diameter of 2.5 μm were mixed with 50 cc of isopropyl alcohol (IPA) and were sufficiently dispersed in the IPA by application of a supersonic wave, and subsequently the dispersion was sprinkled on one of the pair of substrates by means of spin coat method at a rotation frequency of 1000 rpm for 20 seconds. Then the substrates were mated, whereby a panel was manufactured.

After this, the same ferroelectric liquid crystal 8 having properties shown in Table 1 as that used in Embodiment No. 1 was injected into the panel by means of vacuum injection method, and then an opening for injecting liquid crystal was sealed with UV hardening adhesive agent.

Orientation condition of oriented liquid crystal molecules disposed in the ferroelectric liquid crystal panel manufactured in the above manner was observed with a polarizing microscope. Hereupon, the orientation condition of the molecules in the panel according to this embodiment was better than the orientation condition in the case of the panel according to Embodiment No. 1 and was almost the same as the orientation condition in the case of the referential panel having polyimide films provided on both of a pair of substrates shown in Embodiment No. 1.

The panel according to Embodiment No. 2 was connected to a driving circuit and pictures were displayed. In the same way as in Embodiment No. 1, a fixed picture was displayed for two hours and then a different picture was displayed. Hereupon, during the fixed picture, contrast of 20 to 23 could be obtained which is almost the same value as that during the fixed picture in the referential panel shown in Embodiment No. 1. And when the different picture was displayed, contrast was to 19 to 20, that is, the contrast was hardly reduced.

Therefore, it is found that, by providing a polyimide film on a substrate and superposing a polyvinyl carbazole film on the polyimide film, both of a function of orientation control which the polyimide film has and a function of absorbing ionized impurities which the polyvinyl carbazole film has can be effectively fulfilled.

(Embodiment No. 3)

In this embodiment is manufactured a ferroelectric liquid crystal electro-optical device in which a polyimide film is provided on one of a pair of substrates and a polyvinyl carbazole film is provided on the other of the pair of substrates.

Figure 3:
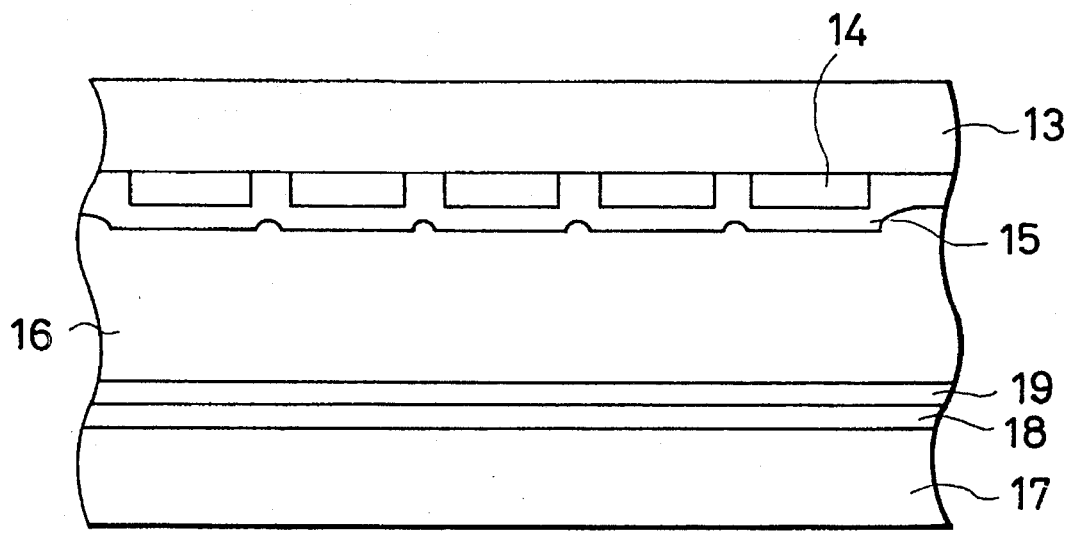
FIG. 3 shows a cross sectional schematic view of a further liquid crystal electro-optical device according to the present invention.

In FIG. 3 is shown a cross sectional schematic view of a ferroelectric liquid crystal electro-optical device according to this embodiment.

An ITO thin film was deposited on a substrate 13 made from soda-lime glass by means of sputtering method, and then the thin film was patterned by means of photolithography method to thereby form electrodes 14.

On the substrate 13, an N-methyl-2-pyrolidone solution in which polyimide was dissolved in the ratio of 3% was applied by means of spin coat method at a rotation frequency of 3000 rpm for 20 seconds. Then the substrate 13 was heated at a temperature of 300° C. for two hours, whereby a polyimide film 15 was obtained. The polyimide film 15 was subsequently subjected to rubbing treatment in one direction by the use of velvet.

On the other substrate 17 was formed transparent electrode strips 18, and then a benzene chloride solution in which polyvinyl carbazole was dissolved in the ratio of 2% was applied on the substrate 17 by means of spin coat method at a rotation frequency of 3000 rpm for 20 seconds. After the application, the substrate 17 was heated for about one hour at a temperature of 150° C. and thereby a solvent in the solution was removed. Consequently, a polyvinyl carbazole thin film 19 was obtained. The film thickness was about 300 Å.

Then silica beads having a grain diameter of 2 μm were sprinkled on one of the pair of substrates, and the two substrates were mated, whereby a panel was manufactured.

Ferroelectric liquid crystal 18 having properties shown in Table 2 was injected into the panel by means of well-known vacuum injection method, and subsequently an opening for injecting liquid crystal was sealed with UV hardening adhesive agent.

TABLE 2

| Phase: Iso ——— SmA ——— SmC* ——— Cry |
|---|
| Transition Temperature: 67° C. 51° C. −1.5° C. |
| Spontaneous Polarization: −8nC/cm² (25° C.) |
| Cone Angle: 36° |

Iso: isotropic phase
SmA: smectic A phase
SmC*: chiral smectic C phase
Cry: crystal Resistivity between the electrodes formed on the pair of substrates provided in the liquid crystal panel according to this embodiment was measured by means of LCR meter manufactured by HP corporation. Hereupon, in the condition just after the injection of the liquid crystal at a temperature of 25° C., the resistivity was $3.1 \times 10^{11}$ Ωcm. Then this liquid crystal panel was heated at a temperature of 80° C., and resistivity between the electrodes versus time of heating the panel was measured. The result of this measurement is illustrated with a solid line in FIG. 4. It is found in FIG. 4 that the resistivity of the liquid crystal panel is clearly raised as the time of heating the panel increases.

Figure 4:
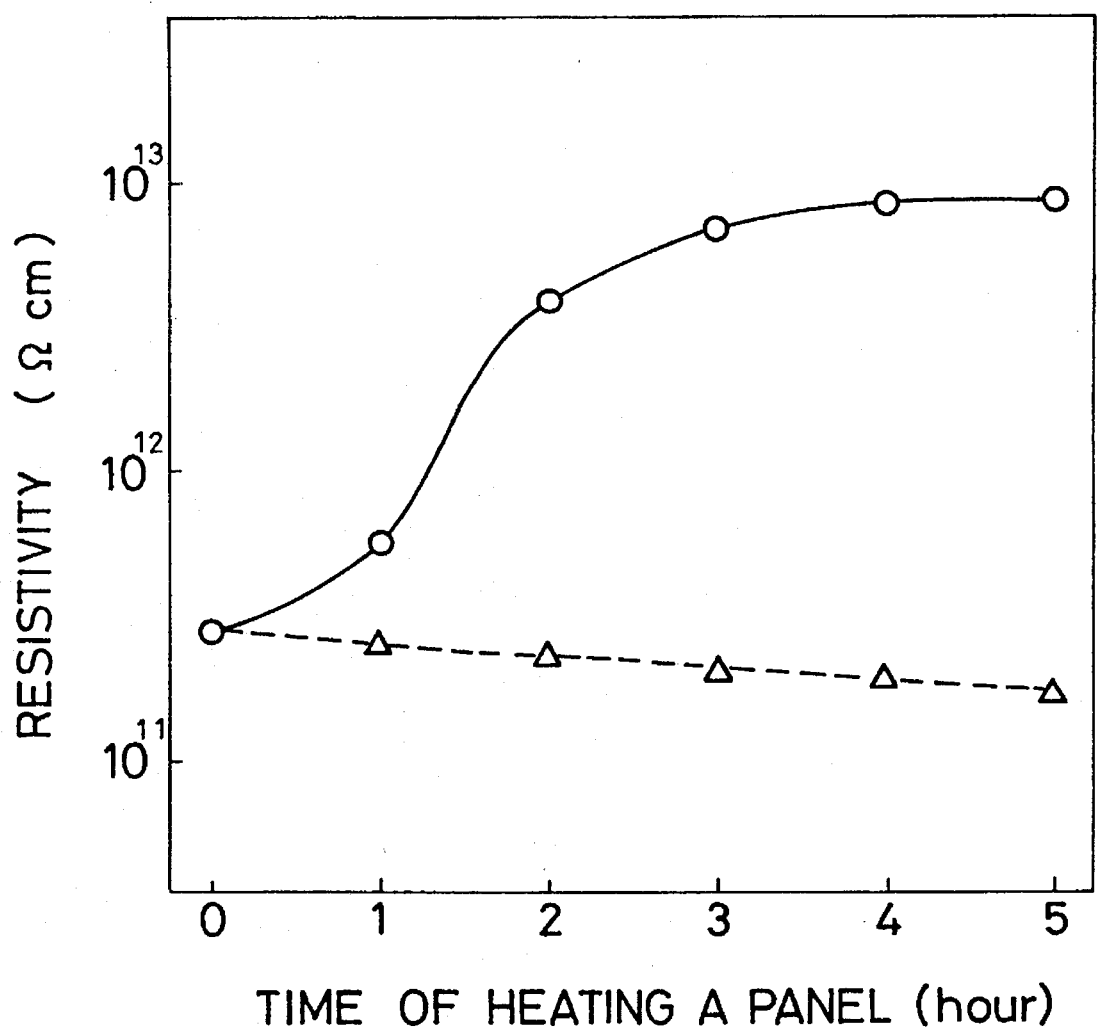
FIG. 4 shows a relation between time of heating a liquid crystal panel and resistivity of the liquid crystal panel.

For reference, the same measurement as the above was carried out with respect to a liquid crystal panel having polyimide thin films provided on both of a pair of substrates, namely the referential panel used in Embodiment No. 1. The result is also illustrated with a broken line in FIG. 4. As shown in FIG. 4, it is obvious that resistivity in the panel having therein polyimide thin films is gradually reduced as time of heating the panel increases. This is because, since polyimide films do not have a function to absorb ionized impurities of donor, the impurities exude in the liquid crystal panel by virtue of the heating. In FIG. 4, small resistivity between electrodes means that many ionized impurities of donor are existing in the liquid crystal layer and that, by applying voltage between the electrodes, a large amount of electric current flows due to many ionized impurities.

Then, concerning the liquid crystal panel according to this embodiment, recovery rate of display by the heating versus the time of the heating (at a temperature of about 80° C.) was measured by means of a following method.

In this measuring method, polarizing plates are placed sandwiching the panel in order that a first stable condition of ferroelectric liquid crystal molecules in the liquid crystal panel causes white display and a second stable condition causes black display. First, 'white' is displayed and the lightness is measured, and then 'black' is displayed for a fixed time (two hours). Just after the 'black' displayed for two hours, 'white' is again displayed and the lightness of 'white' display is measured. Then recovery rate is calculated with the ratio of the lightness of the latter 'white' to the lightness of the former 'white'. The result is shown in Table 3.

As a unit of the heating time is used the hour and as a unit of the recovery rate is used the percent in Table 3, Table 4, and Table 5.

TABLE 3

| heating time | 0 | 1 | 2 | 3 | 4 | 5 |
|---|---|---|---|---|---|---|
| recovery rate | 91 | 93 | 99 | 100 | 100 | 100 |

As apparent in Table 3, particularly the heating for two hours or more is very effective.

For reference, recovery rate versus the time of time of the heating (at a temperature of about 80° C.) was measured with respect to the referential liquid crystal panel having polyimide films provided on both inside surfaces of the substrates. The results are shown in Table 4.

TABLE 4

| heating time | 0 | 1 | 2 | 3 | 4 | 5 |
|---|---|---|---|---|---|---|
| recovery rate | 48 | 50 | 51 | 51 | 50 | 49 |

It is found in Table 4 that, in the case of forming polyimide films on both inside surfaces of the substrates, effect of the heating is hardly obtained.

Next, recovery rate versus heating time was measured with respect to the liquid crystal panel of Embodiment No. 3 in the same way as in the above measurement of Table 3 except that a DC voltage of 20 V is applied between the electrode strips 18 as positive electrodes and the electrode strips 14 as negative electrodes. The results are shown in Table 5. As apparent from Table 5 and Table 3, it takes less heating time to obtain more than 99 percent of recovery rate in the case of Table 5 than in the case of Table 3.

TABLE 5

| heating time | 0 | 1 | 2 | 3 | 4 | 5 |
|---|---|---|---|---|---|---|
| recovery rate | 96 | 100 | 100 | 100 | 100 | 100 |

Since other modification and changes (varied to fit particular operating requirements and environments) will be apparent to those skilled in the art, the invention is not considered limited to the examples chosen for purposes of disclosure, and covers all changes and modifications which do not constitute departures from the true spirit and scope of this invention. For example, the liquid crystal electro-optical device according to the present invention may be a liquid crystal electro-optical device of passive type or active type. In the liquid crystal electro-optical device of passive type, electrode strips are formed in matrix on a pair of substrates. On the other hand, in the case of the liquid crystal electro-optical device of active type, it may be a liquid crystal electro-optical device in which electrode arrangements and thin film transistors as switching elements are formed on one substrate. Alternatively, the liquid crystal electro-optical device of active type may be the one in which electrode arrangements and metal insulator metal devices as switching elements are formed on one substrate.

What is claimed is:

1. A liquid crystal electro-optical display device comprising:

a pair of substrates provided with electrodes thereon, to which a plurality of display pixel elements are connected;

a liquid crystal layer interposed between said substrates;

an orientation control film comprising polyimide formed adjacent to one of said substrates and contacting one surface of said liquid crystal layer; and a film comprising polyvinyl carbazole formed adjacent to the other one of said substrates and contacting the other surface of said liquid crystal.

2. A liquid crystal device comprising:

a pair of opposed substrates, at least one of which is transparent;

an electrode arrangement formed on said substrates;

a liquid crystal layer interposed between said substrates;

an orientation control film comprising polyimide formed on one of said substrates and contiguous to said liquid crystal layer; and an organic layer provided on the other one of said substrates and contacting said liquid crystal layer, wherein said organic layer comprises polyvinyl carbazole and a surface of said organic layer is a rubbed surface.

3. The liquid crystal device of claim 2 wherein a surface of said orientation control film is rubbed.

4. A liquid crystal device comprising:

a pair of opposed substrates, at least one of which is transparent;

an electrode arrangement formed on said substrates;

a liquid crystal layer interposed between said substrates;

a polyimide film formed on at least one of said substrates; and an organic layer provided between said liquid crystal layer and said polyimide film, wherein said organic layer comprises polyvinyl carbazole.

5. The device of claim 4 wherein said polyimide film has a rubbed surface in contact with said organic layer.

6. The liquid crystal device of claim 2 wherein said liquid crystal is ferroelectric liquid crystal, twisted nematic liquid crystal, or super twisted nematic liquid crystal.

7. The liquid crystal device of claim 2 wherein a thickness of said organic layer is from 100 Å to 1000 Å.

8. The liquid crystal device of claim 2 wherein said liquid crystal device is passive type.

9. The liquid crystal device of claim 2 wherein said electrode arrangement includes active devices.

10. The liquid crystal device of claim 2 wherein said device is an active matrix type device and said electrode arrangement includes thin film transistors.

11. The liquid crystal device of claim 2 wherein said device is an active matrix type device and said electrode arrangement includes metal insulator metal devices.

12. The liquid crystal device of claim 2 wherein said organic layer is capable of absorbing mobile ions including sodium, potassium, or lithium ions.

13. The liquid crystal device of claim 4 wherein said liquid crystal is ferroelectric liquid crystal, twisted nematic liquid crystal, or super twisted nematic liquid crystal.

14. The liquid crystal device of claim 4 wherein a thickness of said organic layer is from 100 Å to 1000 Å.

15. The liquid crystal device of claim 4 wherein said liquid crystal device is passive type.

16. The liquid crystal device of claim 4 wherein said electrode arrangement includes active devices.

17. The liquid crystal device of claim 4 wherein said device is an active matrix type device and said electrode arrangement includes thin film transistors.

18. The liquid crystal device of claim 4 wherein said device is an active matrix type device and said electrode arrangement includes metal insulator metal devices.

19. The liquid crystal device of claim 4 wherein said organic layer is capable of absorbing mobile ions including sodium, potassium, or lithium ions.

20. The liquid crystal electro-optical display device of claim 1 wherein said liquid crystal layer comprises a ferroelectric liquid crystal.

21. A liquid crystal electro-optical display device comprising:

a pair of substrates provided with electrodes thereon;

a ferroelectric liquid crystal layer interposed between said substrates;

an orientation control film comprising polyimide formed adjacent to one of said substrates and contacting one surface of said liquid crystal layer; and a film comprising polyvinyl carbazole formed adjacent to the other one of said substrates and contacting the other surface of said liquid crystal.

22. The liquid crystal device of claim 2 wherein said orientation control film consists essentially of a polyimide film.

* * * * *